April 11, 1967 J. S. KILBY 3,313,986

INTERCONNECTING MINIATURE CIRCUIT MODULES

Original Filed Nov. 21, 1960 4 Sheets-Sheet 1

INTERCONNECTING MINIATURE CIRCUIT MODULES

Original Filed Nov. 21, 1960 4 Sheets-Sheet 3

April 11, 1967 J. S. KILBY 3,313,986

INTERCONNECTING MINIATURE CIRCUIT MODULES

Original Filed Nov. 21, 1960 4 Sheets-Sheet 4

United States Patent Office 3,313,986
Patented Apr. 11, 1967

3,313,986
INTERCONNECTING MINIATURE CIRCUIT MODULES

Jack S. Kilby, Dallas, Tex., assignor to Texas Instruments Incorporated, Dallas, Tex., a corporation of Delaware
Continuation of application Ser. No. 70,478, Nov. 21, 1960. This application Dec. 23, 1965, Ser. No. 515,852
18 Claims. (Cl. 317—101)

This application is a continuation of application Ser. No. 70,478, filed Nov. 21, 1960, for Interconnecting Miniature Circuit Modules, now abandoned, which application was a continuation-in-part of application Ser. No. 811,389, filed May 6, 1959, for Interconnecting Miniature Circuit Modules, now abandoned.

This invention relates to an assembly of miniature circuit modules and more particularly to a method and apparatus for providing miniaturized electrical connections.

Semiconductor fabrication techniques permit production of electrical circuit elements so small that interconnections of the leads to the elements present a serious problem. In applicant's copending application Ser. No. 791,602, entitled "Miniaturized Electronic Circuit Elements and Method of Making," filed Feb. 6, 1959, now Patent No. 3,137,843, there is described a technique for producing solid state semiconductor network components an order of magnitude smaller in size than previously known devices. For example, a complete multivibrator, ordinarily involving a pair of triodes with a plurality of interconnecting lumped circuit elements, by the technique described in the above-identified application may be embodied in a volume of the order of ¼ of an inch long, ⅛ of an inch wide and 1/32 of an inch thick. A variety of circuits may be fabricated in modules of like dimension. Each such module may have a predetermined number of leads for connecting the module to external signal and supply circuits. In certain of the devices thus far provided, ten leads extend from the sides of the modular block with five extending from one face and five extending from the opposite face. When several such blocks or modules are to be interconnected in a system, it becomes impossible to eliminate space between the modules and at the same time to interconnect them by conventional circuit techniques. On the other hand, if the modules are not closely spaced, much of the advantage of the miniaturized circuit system is lost.

The present invention provides a method and system for interconnecting circuitry permitting the modules to be closely spaced and thus packaged with maximum space utilization. It is therefore an object of the present invention to provide a miniature circuit assembly which may be prefabricated into multimodule units, which units may then be combined through a mechanically engaging electrical contact system in order to interconnect modules in a small volume.

It is a further object of this invention to provide a means for making circuit connections which utilize a minimum amount of space.

Another object of this invention is to provide a means for dissipating heat generated in small closely packed circuit elements.

In accordance with the present invention, there is provided the combination of a stack of circuit modules, each module having a plurality of leads extending therefrom in a contact plane parallel to but spaced from leads in contact planes of the other modules. A plurality of conductive sheets insulated one from another are stacked against the side of said stack of circuit modules with the contact leads extending through aligned holes in said sheets and selectively connected to different ones of said sheets.

In a further aspect of the invention there is provided a solid state semiconductor network assembly comprising a pair of stacks of circuit modules each having leads extending from at least one face thereof. Frame means support each of the stacks with the leads positioned on the sides thereof. Each frame has at least one rib at each end. Sheet conductors and sheet insulators are positioned on the sides of the frames interleaved with one another, and each having perforations therein with the leads extending selectively therethrough and connected to the sheet conductors to provide a plurality of current paths leading to the modules. A plurality of extensions from the sheet conductors are supported by the ribs to provide a first set of spaced electrical contacts. A pair of positioning bars are located at each end of the stacks and include first conductive means for engaging the ribs at the electrical contacts for extending the current paths to the bars. Each of the bars has a secondary rib extending therealong to span at least a portion of the ends of both frames. Conductors selectively connected to said first conductive means are supported by the secondary ribs to form a second set of electrical contacts adjacent opposite ends of the frames further to extend the current paths. Structure having at least two secondary conductive means engages the second set of electrical contacts to complete the current paths through the last named structure and thence to the modules.

In a further aspect of the invention there is provided a solid state semiconductor network assembly of stacks of circuit modules each mounted in a thermally conducting frame with the module leads extending from one face of each frame. Electrical connecting means are provided on the ends of each frame with connections extending along the face of each stack to said leads. An enclosure is provided for the assembly including contacts for mating with the connecting means on each frame and having a thermally conductive plate in contact with at least one face of each frame for dissipating heat generated in the modules.

For a more complete understanding of the present invention and for further objects and advantages thereof, reference may now be had to the following description of preferred embodiments of the invention taken in conjunction with the accompanying drawings in which.

Figure 7:
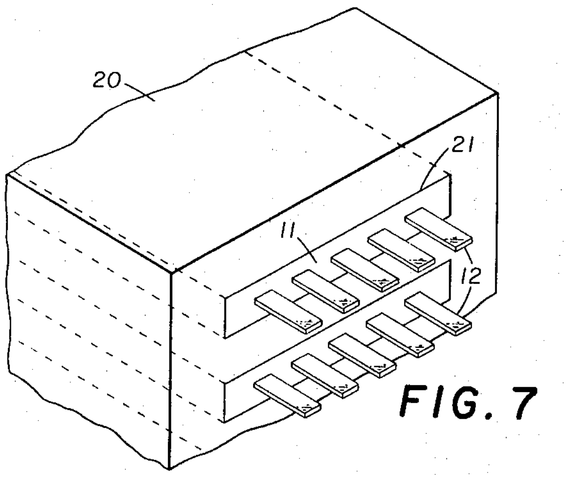
FIG. 7 is a perspective view of a heat conductive mounting.
Figures 8, 9, 10, 11, 12, 13:
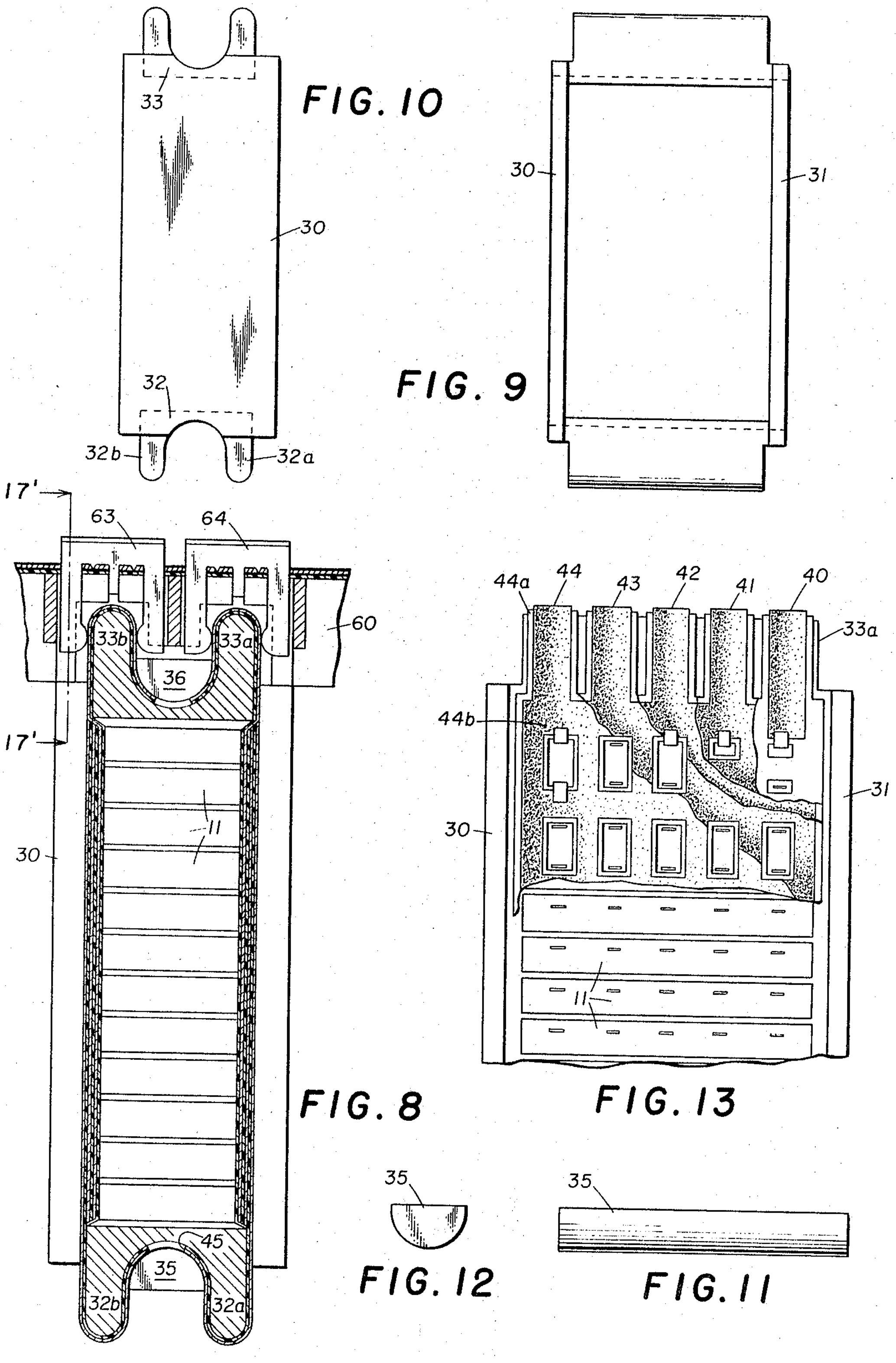
FIG. 8 is a sectional view showing a stack of modules mounted in a supporting frame.
Figures 14, 15, 16, 18:
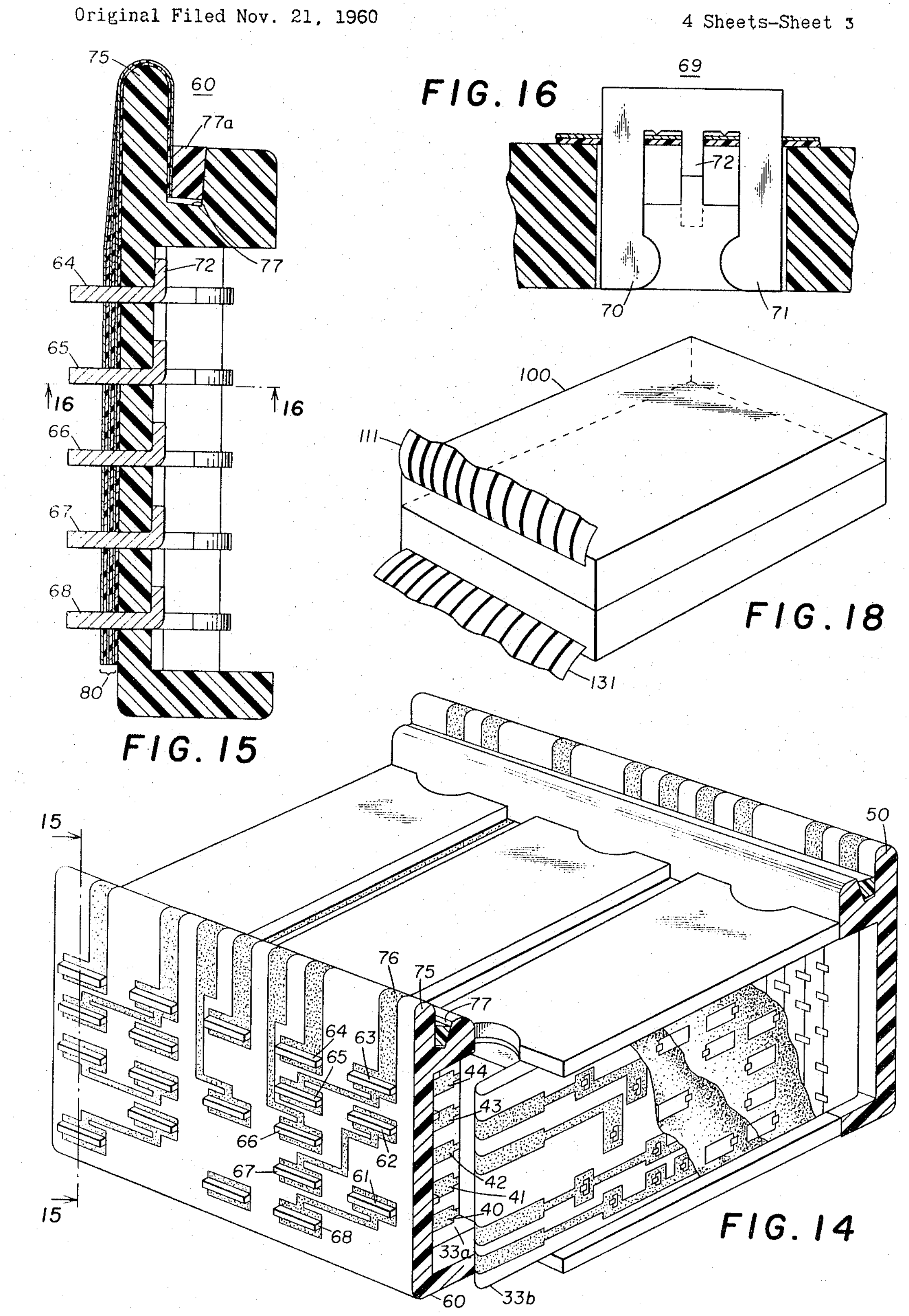
Figure 17:
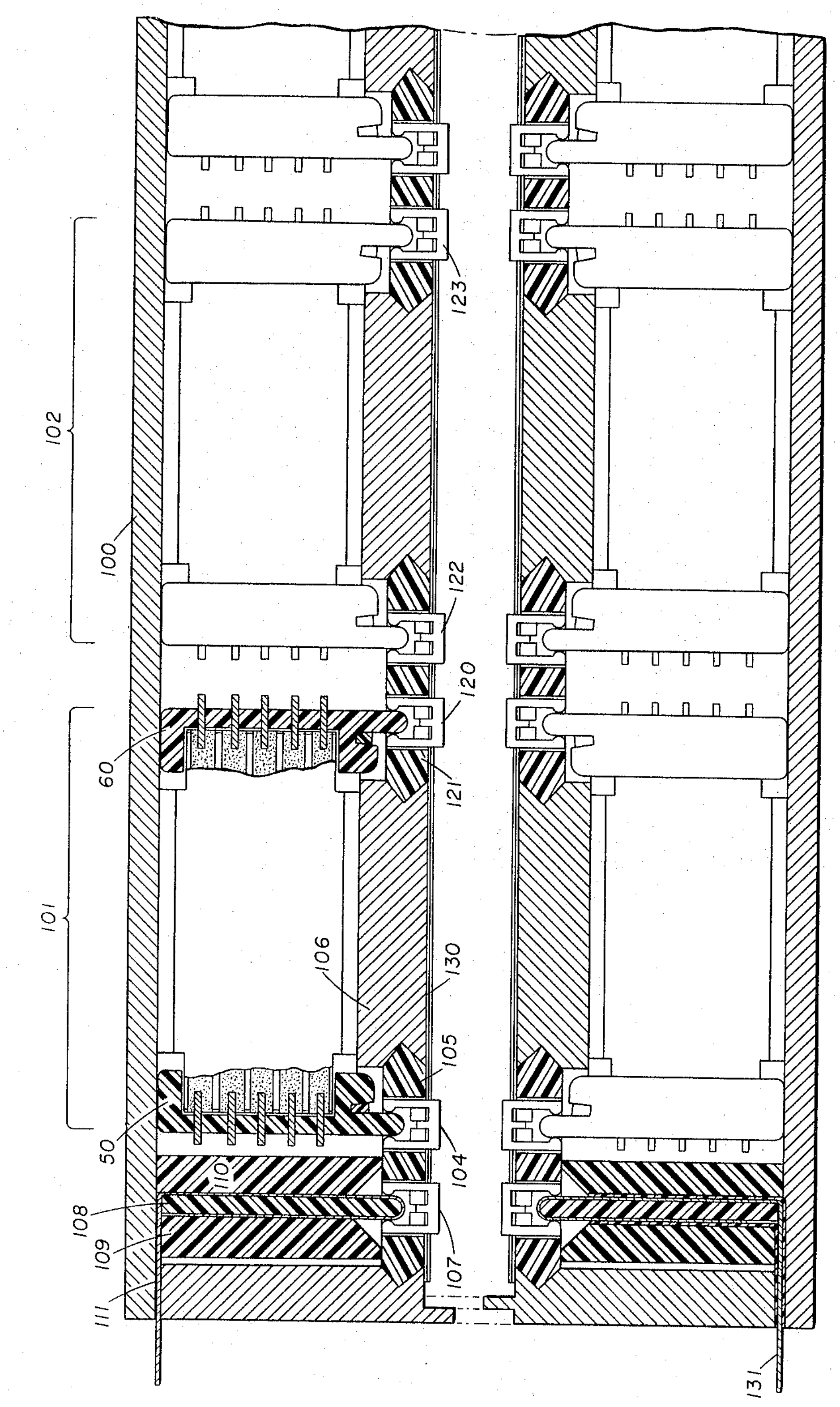

FIGS. 9, 10, 11 and 12 respectively illustrate in slightly reduced scale side and top views of the frame of FIG. 7 and a side and an end view of a tab locking pin;

FIG. 13 is a fragmentary view of a stack of circuit modules showing connections to successive sheet conductors;

FIG. 14 illustrates a mounting for a plurality of stacks of modules in a modular row;

FIG. 15 is a sectional view of a clip bar taken along lines 15—15 of FIG. 14;

FIG. 16 is a view of a contact clip;

FIG. 17 is a view, partially in section, of an assembly comprising six rows of stacked modules; and FIG. 18 is an isometric view of an assembly housing unit.

The following description relates to electrical network modules which are of relatively simple external appearance and requiring two basic types of electrical connections. The first of such connections is to apply and establish supply or reference potentials in the system. A source of power other than the signal being acted upon will thus be connected to the system. Normally several components will utilize the same supply potential although more than one supply potential may be required. A second set of connections serves to transfer the electrical signals being acted upon from one device or component to the next. This transfer may be made from one module to another, from one stack of modules to another stack, from one row of stacks to another row of stacks, or to an output system.

In order to provide the desired assembly of circuit elements, the circuit modules are provided in the form of a rectangular polyhedron. By way of illustration only, elements in a representative module are packaged in a structure of approximately ¼ inch in length, ⅛ inch in width and $\frac{1}{32}$ inch in thickness with five leads extending stiffly from each of two opposite faces thereof, preferably the faces which have the dimensions of ¼ of an inch by $\frac{1}{32}$ of an inch.

Interconnections for such leads are provided by a plurality of thin conductive sheets. One sheet is used to connect each supply potential to the module. A different sheet insulated from the first is provided to establish a ground or reference potential. Sheets of insulating material with printed circuits thereon are then provided for interconnecting the signal terminals of the various modules one to another and for providing connections to circuits external to a given stack of modules. The insulating and conducting sheets are each perforated, the openings therein being positioned to correspond with and receive leads from the stack of modules. Thus the leads from the modules lie in spaced apart parallel planes. The conducting and interconnecting sheets may then be dropped over the leads one at a time in planes which are perpendicular to the planes of the leads. The leads are then connected selectively to the conducting sheets or to printed circuits on the insulating sheets.

Because of the small size and close packing of the module, it may be found necessary to conduct heat therefrom. Where provision for heat removal is required, each stack may comprise modules interleaved with suitable heat conducting layers.

Figure 1:
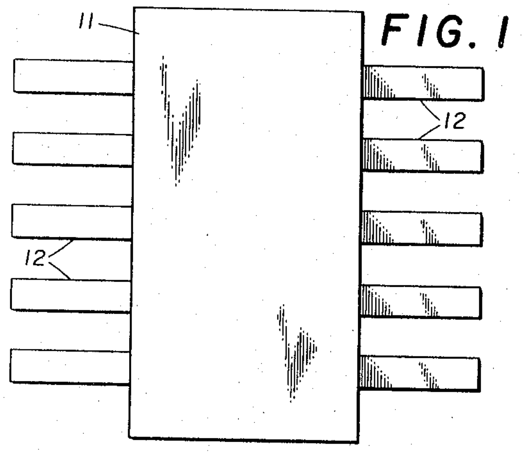
FIG. 1 is a top view of a stack of circuit modules which are to be interconnected by the system of the present invention.
Figure 2:
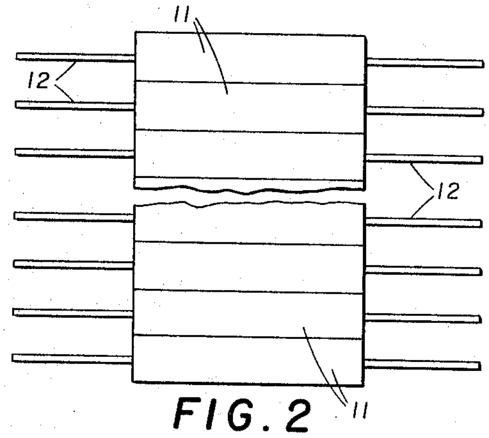
FIG. 2 is an end view of the stack of elements of FIG. 1.

Referring now to FIG. 1, there is illustrated a top view of a solid state semiconductor network of the type disclosed in the above-identified copending application. Each circuit module 11 may have a number of electrical terminals or leads 12 extending from opposite faces thereof. In the embodiment illustrated, five leads extend from one face and five leads extend from the opposite face with all leads lying in a common plane. The leads 12 are in the form of thin, flat conducting tabs of a pliable material such as gold plated copper or Kovar, the trade name for a nickle, iron and cobalt alloy. The leads 12 on each circuit module 11 are evenly spaced from one another. When the circuit modules 11 are stacked one on top of the other as illustrated in FIG. 2, the stack presents on each side thereof an evenly ordered array of rows and columns of leads. This array then is adapted conveniently to mate with sheet insulators and circuit arrays illustrated in FIGS. 3–5.

Figure 3:
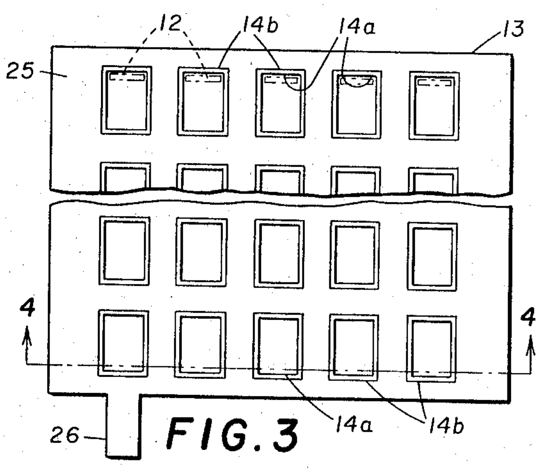
FIG. 3 is a plan view of one conducting sheet used to apply reference potentials to the modules.
Figure 4:
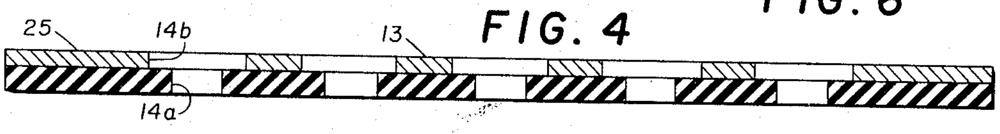
FIG. 4 is a sectional view of the sheet of FIG. 3 taken along the lines 4—4.

Referring to FIG. 3, thin insulated sheet conductors 13 are used to provide the supply potentials to the circuit modules. Each such sheet comprises a conductive film of, for example, copper. The conductive sheets 13 are laminated to an insulating sheet 15 formed of material such as polytetrafluoroethylene, more commonly known as Teflon. Sheets 13 and 15 are perforated, having a plurality of holes 14 arranged in rows and columns. The holes 14 are so arranged that the sheets may be dropped over the leads 12 extending from the stacked circuit modules with each lead passing through a hole in such sheet. In some of the sheets it may be desirable and/or necessary to provide a separate hole for each lead. In others, it has been found satisfactory to utilize a hole of dimensions sufficient to permit two leads to pass through the same hole. As illustrated in FIG. 3, the holes are of oblong shape and are of such size that the leads 12 will readily pass therethrough. As will be observed in FIG. 4, the holes 14*a* passing through the insulating sheet 15 are smaller than the holes 14*b* passing through the conductive sheet 13. Thus, the leads may pass through a series of stacked sheets without making an electrical contact with any of the conductive sheets 13.

In fabricating stacks of modules, insulated conductive sheets 13 are dropped over the leads 12 on each side of a stack of circuit modules 11 one at a time. After each sheet is placed over the leads 12, some of the leads 12 will be bent over and connected to the conducting film, for example by soldering or welding. In this manner, the sheets are successively stacked one on top of the other over the leads 12 with different leads from the circuit modules selectively connected to the desired ones of the sheets 13. All leads 12 in a given stack which are to receive the same supply potential are connected to the same conducting sheet. Thus, by connecting one supply potential to one conducting sheet, this potential may be applied to each of the leads 12 connected to such film and thus to the respective modules by way of such leads. In this manner, each of the necessary supply potentials may be connected to the correct lead of each of the circuit modules.

The sheets 15 of insulating material separate and insulate the conductive sheets 13 from each other. In the example illustrated, a tab 26, which may be an extension of a sheet 13, provides a means, as will hereinafter be detailed, for connecting a supply potential thereto.

Figure 5:
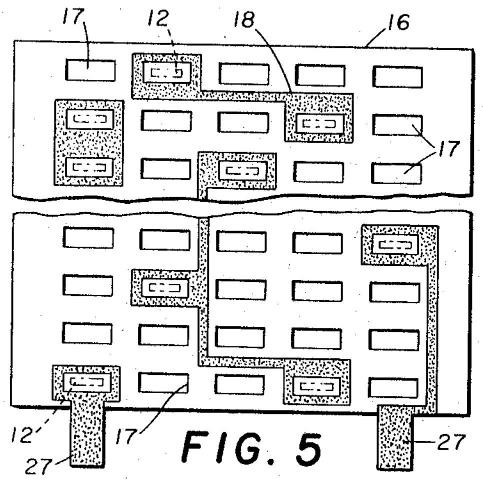
FIG. 5 is a plan view of a sheet for interconnecting signal leads of a stack of modules.

The sheet shown in FIG. 5 is used for interconnecting the signal leads of the several circuit modules. The sheet of FIG. 5 comprises an insulating material which is generally designated by the reference character 16. This sheet is perforated with holes 17 arranged in ordered rows and columns corresponding to the positions of the leads 12 extending from the stack of circuit modules 11. The holes 17 are shaped as above described and are positioned so that the sheet 16 may be mounted with some or all of the leads 12 passing through the holes 17. Where two leads on two different modules are adjacent to one another but are to be connected to different points in a circuit, it is necessary to provide separate holes for each of such leads. Where two adjacent leads may be connected to the same point in a given circuit, then a single hole may be provided. Two leads extending through a single hole are connected to the same conductive sheet but at opposite sides of the hole. On sheet 16, FIG. 5, conductive elements 18 are provided which extend between selected ones of the holes 17. The conductive elements 18 may be formed on the sheets 16 by printed circuit techniques or other well-known means.

The sheet 16 is positioned with the leads 12 passing through holes 17. Those of leads 12 which comprise the signal leads are then bent over and connected to the conductive elements 18. The conductive elements 18 are preselected and are so shaped as to run between the designated holes so that connections of the signal leads to the conductive elements result in the desired connections between elements of the different modules.

Where signal paths of a circuit require the conductive elements 18 to cross one another, additional sheets may be employed. Thus there results a stack of sheets on each side of the stack of modules, providing interconnections for the modules and for application of the necessary supply and signal potentials. The stacks of sheets lie in planes which are perpendicular to the planes of the leads extending from each module. Conductive tabs, such as tab 26 of FIG. 3, generally extend in the plane of a given sheet to a connector element as will hereinafter be described.

The electrical signal which is to be acted upon may be introduced into the circuit by means of tabs such as tab 27 of FIG. 5. Although separate stacks of the modules may be interconnected utilizing more conventional lead wire to the connector tabs 26 and 27, a preferred embodiment of the invention involves the connector systems as hereinafter described. Larger sheets, however, of insulating and conducting material might be employed and interconnected in a manner to provide the necessary voltages to the proper sheets on each stack of circuit modules. Such larger sheets would extend from the tabs of one stack of modules to the tabs of another stack of modules. For example, several stacks of the modules can be placed adjacent to one another with the leads 12 oriented in the same direction. One or more larger sheets can then be used for interconnecting the stacks in the same manner as above described for interconnecting the modules of FIG. 3. Subassemblies are then interconnected by still larger sheets. In this manner, complex systems can be assembled in a minimum amount of space and without the use of the more conventional interconnecting lead wires.

It may be desirable to provide insulation over both the surfaces of the conductors except in those regions where connections are being made. While it would be necessary to provide slots only where the leads are to extend for required connections, in general, it will be found desirable to provide sheets of conductors and insulating material which are uniformly perforated to receive leads also uniformly located on the circuit modules so that maximum advantage may be taken of repetitive component geometry.

Figure 6:
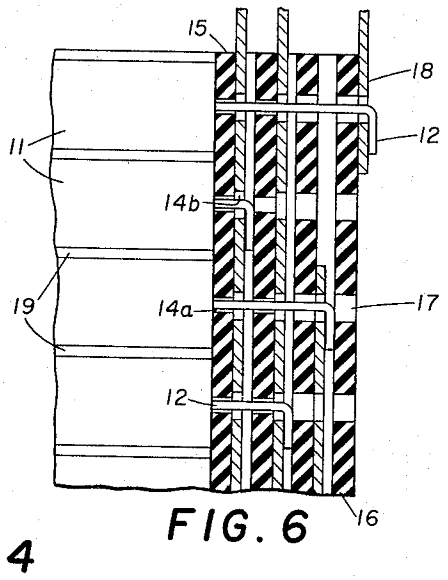
FIG. 6 is a sectional view of a corner of a stack of circuit modules interconnected in accordance with the present invention.

In FIG. 6 there is illustrated a sectional view of a portion of an assembled stack of modules with the conductive and insulating sheets stacked against one face thereof. The stacked sheets 13 and 16 are illustrated with the leads 12 extending into the apertures formed by the aligned holes in the stacks of sheets 13 and 16 and also illustrating electrical connections between selected ones of the leads 12 and conductive elements on the insulating sheets.

Because of close packing of the circuit modules, substantial amounts of heat may be generated. Therefore, it is sometimes necessary to provide means for dissipating the heat from a given stack. Such heat conducting means may comprise sheets 19 of material such as copper having high thermal conductivity which are stacked between and interleaved with the circuit modules 11. Alternatively and as illustrated in FIG. 7, the circuit modules may be placed in slots 21 machined into a heat conducting block 20. The heat conducting sheets 19, FIG. 6, or block 20, FIG. 7, carry away and thus dissipate the excess heat and maintain the circuit modules within operating temperature ranges.

In addition to the circuit modules such as described in the copending application, Ser. No. 791,602 of applicant entitled "Miniaturized Electronic Circuits and Method of Making" and filed Feb. 6, 1959, now Patent No. 3,137,843, the present invention is applicable to provide interconnections and reference potentials to any miniature circuit modules or any system where a large number of leads must be interconnected in a small space. For example, rather than having circuit modules, the system may be comprised of a large number of individual components mounted on separate wafers of an appropriate substrata material. Also, it is possible to use rigid tabs of metal or ceramic and the apertures in the various circuit connecting sheets may be selectively sized to obtain electrical contact between the rigid tabs and the circuit connecting sheets when the circuit connecting sheets are placed on the rigid tabs.

Thus, features of the invention thus far described include a stack of circuit modules having leads extending therefrom in rows and columns with a stack of insulating and conductive sheets fitted over the leads wherein the leads are selectively connected to the conductive elements in different ones of the sheets. A plurality of tabs or extensions of the conductive sheets protrude from the stack of sheets for applying reference and signal potentials thereto.

In FIGS. 8–18 there is illustrated a system for utilizing to full advantage such stacks to complete connections to rows of stacks of modules and thence to an assembly of rows of modular stacks.

The basic building block for such a complex is the module of FIG. 1. The next step in the ordered arrangement is the modular stack of FIG. 2 suitably interconnected by the sheet connecting means of FIGS. 3–5. In a preferred form, the stacks are assembled in a support means such as a frame 29 in the manner illustrated in FIG. 8. The leads from the modules are interconnected by the sheet conductors and are not seen. The frame 29 in which the stack of 12 modules is mounted is illustrated in FIGS. 9 and 10 in slightly reduced scale. The frame 29 comprises upper and lower plates 30 and 31, respectively. End members 32 and 33 are secured to plates 30 and 31 to hold them in spaced apart relation and form a rectangular opening into which the stack of FIG. 2 may be inserted. The frame 29 was formed in one embodiment from a solid block of aluminum providing for thermal conductivity from each stack of circuit modules. The ends 32 and 33 are each provided with a pair of elongated protrusions or ribs **32*a* and 32*b*. The ribs serve to support the tabs, such as tabs 26 and 27 of FIGS. 3 and 5, respectively, for contact with a mating element which is common to a plurality of stacks of modules. As illustrated in FIG. 8, the various tabs forming extensions of the insulating and conducting leads extend substantially in the planes of the leads to encircle the ribs 32*a* and 32*b*. Each such tab extending over the ribs 32*a* and 32*b* includes a conductor and an insulator, the latter being positioned between the conductor and the metallic ribs. The tabs extending over ribs 32*a* and 32*b* are locked into place by a D-shaped rod 35 of an insulating material, end and side views thereof being shown in FIGS. 11 and 12, respectively. Rod 35 is dimensioned to require a force fit into the valley between the conductor surfaces extending over ribs 32*a* and 32*b* frictionally to lock the tabs in place. Similarly, the tabs extending around the ribs 32*a* and 32*b* are locked in place by the rod 36**.

A side view of the stack of modules 11 mounted in the frame 29 is illustrated in FIG. 13. The rib **33*a* is shown supporting five tabs or conductive bands 40, 41, 42, 43 and 44. The latter bands each represent a tab, such as tab 26 or tab 27 of FIGS. 3 and 5, respectively. Each of the bands 40–44 represents an extension of a conductive member on a different layer of the sheet conductors placed over the face of the stack of elements 11. More particularly, an insulating sheet 44*a* underlying the conductive sheet 44*b* extends over rib 33*a* at the left hand side of the rib as viewed in FIG. 13. The metallic extension or tab 44 also is folded over the rib 33*a* but is insulated therefrom by the extension 44*a*. Sheets 44*a* and 44*b* comprise the first layer to be placed over the stack of modules 11. The conductor of the next layer is terminated in the tab 43 which is similarly insulated from rib 33*a*. The third layer is terminated by the tab 42, the fourth layer is terminated by the tab 41 and the final layer is connected to the tab 40**.

It will be recognized that more layers may be employed since this system thus far described provides for ten different tabs to be brought out from each side of each stack so that twenty different circuit connections may, in accordance with the construction shown in FIG. 13, be provided to a single stack of circuit modules. As shown in FIG. 8, the tabs extend over the ribs to a point such as point 45 adjacent the center line thereof but the ends are spaced so that the tab circuits are maintained separate.

Stacks of circuit modules may then be arranged in rows to form a plug-in unit with the row-forming members being illustrated in FIG. 14. More particularly, a pair of bars 50 and 60 are provided to interconnect each row of stacked circuit modules. In one embodiment of the invention twelve modules were mounted in each stack, and ten stacks were assembled in each row by bars such as bars 50 and 60. Each of bars 50 and 60 has the form of a U-shaped channel into which there extends a plurality of columns of clips. More particularly, each of bars 50 and 60 has two columns of clips for each module stack to receive ribs 32*a*, 32*b*, 33*a*, and 33*b*. In FIG. 14 the clips 61, 62 and 63 are mounted one above the other to form one column. Similarly, clips 64, 65, 66, 67 and 68 are mounted to form a second column. The details of such connection are illustrated in FIG. 8. A pair of clips 63 and 64 are shown mounted in the bar 60 with the arms of the clips in contact with the tabs extending around the protrusions 33*a* and 33*b*.

Thus, the ribs 32*a* and 32*b* may be positioned in alignment with a pair of clip columns for completing circuit connections from the tabs 40–44 on rib 33*a* and similar tabs on rib 33*b*. Each of the clips may be of the configuration illustrated in FIG. 16 where clip 69 includes arms 70 and 71. A center tab 72 is provided, an extension of which is shown dotted. The clip 69 is adapted to be inserted into a slot milled through the base of the U-shaped channel 60. Insulating and/or conductive material is then positioned over the slot between the arms 70 and 71. The tab 72 is then bent at right angles into a channel in the center of the bar 60 to maintain the clip in position. In FIG. 15 the five clips 64–68 are shown in position extending through slots in the bar 60 with the extensions such as extension 72 turned over to lock the same into the bar 60.

The bars 50 and 60 are formed from a molded plastic material and are provided with a ridge or nose 75. Electrical conductors such as strips of copper or Kovar then extend from selected ones of the clips 63–68 over the ridge 75. For example, a strip 76 extends from the clip 63 over ridge 75 and into a locking groove 77. As seen in FIG. 15, by the use of assembly bars such as 50 and 60, a plurality of stacks may be locked together physically to form a row of stacks and at the same time to complete electrical connections to the stacks to interconnect the elements of the stacks and to provide for electrical connections to points in the circuit external to a given row of stacks.

The conductive strips and insulating sheets 80 extend upward and over the crown of the ridge 75 and down into the slot 77 where they are secured by wedge 77*a*. As illustrated in FIG. 16, the sharp points 73 adjacent the center tab 72 are pressed into contact with the conductive elements where desired on the strips 80 to complete connections to conductors extending over the crown of ridge 75. Preferably such points are soldered or welded to the conductors to assure circuit continuity at the junction.

Referring now to FIG. 17, there is illustrated six rows of stacked modules mounted in a common housing to provide a unitary multicircuit assembly of units formed from the basic circuit module of FIG. 1.

They are housed within a casing 100 which is provided with a plurality of contact clips which engage the conductive elements extending over the ridges 75 on the row bars 50 and 60 to provide interconnections between such circuits or to systems outside the housing 100 as may be desired. A first row, which includes the bars 50 and 60, is mounted at one end of the housing 100. A second row 102 is positioned adjacent to the row 101. Additional rows may be provided as desired.

In the form illustrated, two tiers of rows are shown in which the row 103 is positioned below row 100. Separate compartments are provided for each of the tiers of rows. In FIG. 17 the compartments are shown slightly spaced one from another, it being understood that they may form parts of a unitary package or may comprise a pair of complete enclosures for each tier which may then be joined as a single unit one above the other. Alternatively, both compartments may be so oriented as to comprise members of the same tier of rows. In either case the interconnections between rows as well as to external circuits are provided in the following manner.

Each row is characterized by a plurality of stacks of circuit modules, each secured together in rows by bars such as bars 50 and 60. A row 104 of conductive clips is mounted in a wedge-shaped insulating block 105. The latter block is secured in a wedge-shaped groove which is formed in the housing plate 106.

Preferably the plate 106 is metallic and in part is substantially thicker than the insulating block 105 so that it extends upward into contact with the lower frame plates such as the plate 31. The frame including plate 31 in which the modules are mounted provides for thermal conductivity so that contact with the housing plate 106 provides for a heat sink from which heat generated inside the modules may be conducted or radiated. Further, it is desirable that the cover plate of the housing 100 contact the upper plates of the modular stacks such as plate 30 similarly to provide for heat removal.

A second set of clips including clip 107 is also mounted in element 105 and is adapted to receive and contact conductive elements on an output plug element 108. An insulating strip carrying rows of conductive elements thereon may thus be folded over the bar 108 as secured between blocks 109 and 110 to provide connections extending by way of port 111 to a point outside the housing 100. A row of clips 104 thus provides connections to the terminals on bar 50. Similarly, a row of clips 120 mounted in a wedge-shaped insulating block 121 provides for completing connections to conductive elements carried by the bar 60. A row of clips 122 mounted in the elements 121 completes connections to the left hand bar of the row 102 and a row of clips 123 completes connections to conductors on the right hand bar of row 102.

The rows of clips 104, 107, 120 and 122 are mounted in units 105 and 121, respectively, as above described, grooves being formed in blocks 105 and 121 and slots provided transversely to the latter groove so that the clips may be inserted through the slots into the longitudinal grooves with a locking nub bent over into the bottom of the groove. The electrical insulating and conductive layers, such as illustrated at 130, may then be provided for interconnecting the rows of clips 104, 120, 122 and 123, and like clips in the remaining rows to selected clips in the row of clips 107. By this means, an assembly of circuit module elements is provided having connections by way of strip 111 which leads from the upper tier of modular rows in the housing 100 to external circuits. A similar strip 131 leads from the lower tier of modular rows of housing 100 to external circuits. By thus packaging the various constituents of a modular array, it is possible to provide an element density of the order of several million elements per cubic foot of space. This represents a substantial improvement over systems heretofore available. However, in packaging components of relatively high cost, it is most desirable that subsections of components be made accessible for test and for replacement if necessary. Accordingly, a preferred embodiment of the invention involves the use of modular subassemblies which may be combined by mechanically supporting, electrical connecting means to form more complex assemblies.

Unique features of the present invention whereby the sheets of conductive material positioned adjacent the faces of circuit modules to provide the necessary interconnections makes possible maximal utilization of miniature circuit techniques. It will be readily apparent that the conductor strips 111 and 131 may well be anchored on a plug element much in the same way as the conductive strips on the ridge 75 so that all of the elements in the housing 100 of FIGS. 17 and 18 could be interconnected with like units to further extend the building process. Essential to this concept, however, is the utilization of the stacked module of FIG. 1, the extension of the interconnecting sheets to prongs or tabs at the output of each module for forming plug terminals for connections to adjacent rows and adjacent stacks.

In a preferred form of the invention a solid state semiconductor network assembly involves a unique stack of circuit modules wherein each stack has leads extending in a contact plane from opposite faces thereof. Each stack preferably is mounted in a thermally conductive frame, each frame having openings in a first side and in a second side opposite the first side to receive and support the stack of circuit modules with the leads extending from the openings therein. Each frame supports a pair of rib structures at each end of which ribs extend along lines parallel to the planes of the openings in the frame and parallel to the contact planes on the circuit modules. Preferably the frame also has thermally conductive plates forming the fifth and sixth sides thereof. Sheet conductors and sheet insulators interleaved one with another and having perforations aligned with one another and passing through the sheets with leads from the modules extending therethrough and selectively connected to the sheet conductors provide a plurality of current paths from the modules. Extensions from the sheet conductors supported in spaced relation by the rib structures on each frame provide a first set of plug terminals for current paths from the modules.

To assemble such frame mounted modules positioning bars at each end of a plurality of stacks include first conductive means for engaging the plug terminals to extend the current paths from the modules. A secondary rib structure on each bar supports in spaced relation conductors which are selectively connected to the first conductive means to form a second set of plug terminals adjacent opposite ends of the frames further to extend the current paths from the modules, thus mounting the stacks of modules in an ordered row with the frame plates lying in two spaced parallel planes.

An enclosing structure is provided for rows of modular stacks preferably of thermally conductive material which engages the frame plates for heat flow therefrom. The enclosing structure also includes electrical circuits having at least two secondary conductive means for engaging the second set of plug terminals to complete current paths from the modules to the enclosing structure while conducting internally generated heat from the modules. Thus there are provided unique combinations and sub-combinations of elements which are readily adaptable to manufacture, assembly and use while permitting ready accessibility for service.

Having described the invention in connection with certain embodiments thereof, it will be understood that further modifications will now suggest themselves to those skilled in the art and it is intended to cover such modifications as fall within the scope of the appended claims.

What is claimed is:

1. An assembly comprising a stack of circuit module elements, a stack of electrically conducting sheets mounted against one side of said stack of circuit module elements, and means insulating each of said conducting sheets from each other, said stack of conducting sheets having a plurality of aligned holes defined therein passing through each of said sheets, each of said circuit module elements having a plurality of leads extending into different ones of said holes to the depths of selected ones of said sheets, where said leads are bent over at said depths and are each connected to said selected ones of said conducting sheets, and sheets of heat conducting material mounted between the circuit modules in said stack.

2. In a solid state semiconductor network assembly, the combination which comprises a pair of stacks of circuit modules each having leads extending from at least one side thereof, a pair of frames separately supporting said stacks with said leads positioned on the sides of said frames and each said frame having at least one rib at each end, sheet conductors and sheet insulators on said sides of said frames interleaved with one another and each having perforations therein with said leads extending selectively therethrough and connected to said sheet conductors to provide a plurality of current paths from said modules, a plurality of extensions of said sheet conductors supported in laterally spaced relation by said ribs to provide a first set of electrical contacts, a pair of positioning bars with one at each end of said stacks and each including first conductive means for engaging said ribs at said electrical contacts for extending said current paths from said modules to said bars, rib structure on each of said bars, conductors selectively connected to said first conductive means and supported by the rib structure to form a second set of electrical contacts adjacent opposite ends of said frames further to extend current paths from said modules, and structure having at least two secondary conductive means engaging said second set of electrical contacts to complete current paths from said modules to said structure.

3. In a solid state semiconductor network assembly, the combination which comprises a pair of stacks of circuit modules each having leads extending from opposite faces thereof, a pair of frames each having two opposed sides open to receive and support one of said stacks with said leads extending from said open sides and each supporting a pair of rib structures at each end thereof, sheet conductors and sheet insulators on the lead faces of said stacks interleaved with one another and each having perforations therein with said leads extending selectively therethrough and connected to said sheet conductors to provide a plurality of current paths from said modules, a plurality of extensions of said sheet conductors supported by said rib structures to provide a first set of electrical contacts, a positioning bar adjacent to each end of said stacks and each said bar including a secondary rib structure and first conductive means for engaging said ribs at said electrical contacts for extending current paths from said modules to said bars, conductors selectively connected to said first conductive means and supported by the secondary rib structures of said bars to form a second set of electrical contacts adjacent opposite ends of said frames further to extend current paths from said modules, and assembly structure having at least two secondary conductive means engaging said second set of electrical contacts to complete current paths from said modules to said assembly structure.

4. In a solid state semiconductor network assembly, the combination which comprises a pair of stacks of circuit modules each having leads extending from at least one side thereof, a pair of frames, one for supporting each of said stacks with said leads extending from the sides thereof and each said frame having at least one rib at each end, sheet conductors and sheet insulators at the sides of said frames interleaved with one another and each having perforations therein with said leads extending selectively therethrough and connected to said sheet conductors to provide a plurality of current paths from said modules, a plurality of extensions of said sheet conductors supported in spaced relation by said ribs to provide a first set of plug terminals for said current paths, a pair of positioning bars with one at each end of said stacks and each including first conductive means for engaging said plug terminals for extending said current paths from said modules to said bars, each of said bars having a secondary rib, conductors selectively connected to said first conductive means and supported by said secondary ribs to form a second set of plug terminals adjacent opposite ends of said frames further to extend current paths from said modules, and structure having at least two secondary conductive means engaging said second set of plug terminals to complete current paths from said modules to said structure.

5. In an electronic assembly, the combination which comprises a stack of electrical components having leads extending from at least one side thereof, means for supporting said stack with said leads extending from the side thereof, sheet conductors and sheet insulators interleaved with one another and each having aligned perforations therein with said leads extending selectively therethrough and connected to said sheet conductors to provide a plurality of current paths from said electrical components, with the perimeter of each perforation in each of said sheet insulators lying substantially inside the perimeter of the aligned perforations in said sheet conductors, a plurality of extensions of said sheet conductors, and means to support said extensions in laterally spaced relation to provide a set of electrical plug terminals for said current paths.

6. In a solid state semiconductor network assembly, the combination which comprises a stack of circuit modules having leads extending from opposite faces thereof, a frame having two opposite sides open to receive and support said stack with said leads extending from said open sides and supporting a pair of rib structures at each end thereof, sheet conductors and sheet insulators interleaved with one another and each having perforations therein with said leads extending therethrough and with said leads selectively connected to said sheet conductors to provide a plurality of current paths from said modules, and a plurality of extensions of said sheet conductors supported in spaced relation by said rib structures to provide a set of electrical plug terminals for said current paths at each end of said frame.

7. In a solid state semiconductor network assembly, the combination which comprises a stack of circuit modules having leads extending from opposite faces thereof, a frame having openings in two opposite sides to receive and support said stack with said leads extending from said openings, a pair of rib structures at each end and thermally conductive plates forming the fifth and sixth sides thereof in contact with the ends of said modules for dissipating heat therefrom, sheet conductors and sheet insulators interleaved with one another and having aligned perforations with said leads extending therethrough and with said leads selectively connected to said sheet conductors to provide a plurality of current paths forming said modules, and a plurality of extensions of said sheet conductors supported in spaced relation by said rib structures to provide a set of plug terminals for said current paths at each end of said frame for interconnecting said stack of circuit modules to circuits external of said frame.

8. In a solid state semiconductor network assembly, the combination which comprises a pair of stacks of circuit modules each having leads extending in a contact plane from opposite faces thereof, a pair of thermally conductive frames each having openings in a first side and in a second side opposite said first side to receive and support one of said stacks with said leads extending from said openings, each said frame supporting a pair of rib structures at each end thereof which extend along lines parallel to the planes of said openings and to said contact plane and having thermally conductive plates forming the fifth and sixth sides, sheet conductors and sheet insulators interleaved with one another and each having perforations therein with said leads extending selectively therethrough and connected to said sheet conductors to provide a plurality of current paths from said modules, a plurality of extensions of said sheet conductors supported in laterally spaced relation by said rib structures to provide a first set of plug terminals for current paths from said modules, a positioning bar adjacent to each end of said stacks and each said bar including first conductive means engaging said first set of plug terminals for extending current paths from said modules to said bars, secondary rib structure on each said bar, conductors selectively connected to said first conductive means and supported in spaced relation by the secondary rib structures of said bars to form a second set of plug terminals adjacent opposite ends of said frames further to extend current paths from said modules, and an enclosing structure of thermally conductive material engaging said plates of said frames and having electrical circuits including at least two insulated secondary conductive means engaging said second set of plug terminals to complete current paths from said modules to said structure while conducting internally generated heat from said modules.

9. An article of manufacture comprising a solid state semiconductor network assembly of a stack of circuit modules having leads extending from at least one side thereof, a frame for supporting said stack with said leads extending from the side thereof and having at least one rib at each end, sheet conductors and sheet insulators at said side of said frame interleaved with one another and each having aligned perforations therein with said leads extending selectively therethrough and connected to said sheet conductors to provide a plurality of current paths from said modules, a plurality of extensions of said sheet conductors supported in laterally spaced relation by said ribs to provide a set of electrical plug terminals for said current paths at each end of said frame.

10. An article of manufacture comprising a solid state semiconductor network assembly of a stack of circuit modules having leads extending from opposite faces thereof, a frame having two opposite sides open to receive and support said stack with said leads extending from said open sides and supporting a pair of rib structures at each end thereof, sheet conductors and sheet insulators interleaved with one another and each having perforations therein with said leads extending therethrough and selectively connected to said sheet conductors to provide a plurality of current paths from said modules, and a plurality of extensions of said sheet conductors supported in spaced relation by said rib structures to provide a set of electrical plug terminals for said current paths at each end of said frame.

11. A solid state semiconductor network assembly which comprises a plurality of stacks of circuit modules each having leads extending in a contact plane from opposite faces thereof, thermally conductive frames for individually mounting each of said stacks with each frame having openings in a pair of oppositely located sides to receive and support one of said stacks with the leads thereof extending from said openings, each said frame supporting at each end thereof a pair of rib structures which extend along lines parallel to the planes of said openings and parallel to each said contact plane and having thermally conductive plates forming the fifth and sixth sides thereof, a stack of sheet conductors and sheet insulators interleaved with one another mounted on each side of each said stack of modules each having perforations aligned therein with leads extending therethrough and selectively connected to said sheet conductors to provide current paths from said modules in each of said stacks, extensions from said sheet conductors supported by said rib structures to provide plug terminals for said current paths at each end of each said frame, a plurality of positioning bars one adjacent to each end of said stacks to mount said stacks in rows wherein each said bar includes first conductive means for engaging said first set of plug terminals to extend current paths from modules in each of said rows to said bars, a secondary rib structure extending along the length of each said bar, conductors selectively connected to said first conductive means and supported in spaced relation by the secondary rib structures of said bars to form a second set of plug terminals on opposite sides of each row of said frames further to extend current paths from said modules, a housing structure of thermally conductive material engaging said plates on opposite sides of each said row for dissipation of heat generated upon current flow in said modules, an insulating insert in said housing adjacent the location of each of said secondary rib structures and including secondary conductive means for engaging said second set of plug terminals further to extend current paths from said modules, and conductors selectively connected to said secondary conductive means for extending said current paths from said modules to points outside said housing.

12. An electrical component packaging system which comprises:

(a) a plurality of multi-element circuit modules of like configuration and each having terminals extending in regular uniform spacing from a terminal face thereof, (b) support means for maintaining a predetermined number of said modules in a stack with the terminal faces in a common plane wherein said terminals extend from said plane in a regular pattern, (c) a stack of interleaved electrically conductive sheets and insulating sheets all of which are perforated in a pattern corresponding with said regular pattern and positioned against said face with said terminals selectively extending through the perforations and connected to different ones of said conductive sheets, and (d) conductive extensions of said sheets positioned on said support means.

13. A component packaging system which comprises:

(a) a plurality of multi-element circuit modules of like configuration and each having terminals extending from a terminal face thereof, (b) support means for maintaining said modules in a stack with the terminal faces in a common plane wherein said terminals extend from said plane, (c) a stack of interleaved electrically conductive sheets and electrically insulating sheets all of which are perforated with said terminals selectively extending through the perforations and connected to different ones of said conductive sheets, (d) a secondary terminal support structure extending along one edge of said support means parallel to said plane, and (e) conductive extensions of said conductive sheets positioned on said secondary terminal support structure of said support means.

14. In an electrical assembly, the combination which comprises:

(a) a plurality of electrical components each having leads extending therefrom, and (b) a plurality of sheet conductors and sheet insulators interleaved with one another adjacent to one face of each of said components and selectively connected to said leads with a first continuous conductive sheet to apply a supply potential to said components and with a second continuous conductive sheet insulated from the first to apply a supply potential to said components and with a third printed circuit conductive sheet adjacent to at least one of said first sheet and second sheet to apply a signal potential relative to said supply potential to said components.

15. The combination set forth in claim 14 in which one of said continuous sheets is connected to a reference potential.

16. An electrical assembly which comprises:

(a) an array of electrical components including a plurality of semiconductor devices each having one face lying in substantially the same plane, (b) a continuous thin insulating sheet adjacent to said plane with a continuous conductive supply potential sheet on the side of said insulating sheet opposite said components, (c) a different continuous conductive sheet parallel to and insulated from the first to establish a reference potential, (d) a sheet of insulating material with a signal conductor sheet thereon and positioned next adjacent at least one of the conductive sheets and positioned on the side thereof opposite said components, and (e) means for selectively extending connections from terminals of said components to said supply sheet, said reference potential sheet, and said signal conductor whereby at least one of said supply and reference potential sheets serves as a shield between said signal conductor sheet and said components.

17. The combination set forth in claim 16 in which said signal conductor sheet is in printed circuit form.

18. The combination set forth in claim 16 in which said components are semiconductor networks with leads extending therefrom parallel to said plane and with said leads extending through said sheet and selectively connected to the supply sheets and said signal conductor sheet.

References Cited by the Examiner

UNITED STATES PATENTS

| | | | |
|---|---|---|---|
| 2,502,291 | 3/1950 | Taylor | 317—101 X |
| 2,816,253 | 12/1957 | Blitz | 317—101 |
| 2,995,686 | 8/1961 | Selvin | 317—101 |
| 3,141,999 | 7/1964 | Schneider | 317—101 X |

ROBERT K. SCHAEFER, *Primary Examiner.*

W. C. GARVERT, J. R. SCOTT, *Assistant Examiners.*